Sept. 17, 1957    W. J. COMSTOCK, JR    2,806,731
MILK BOTTLE CARRIER
Filed Oct. 8, 1953
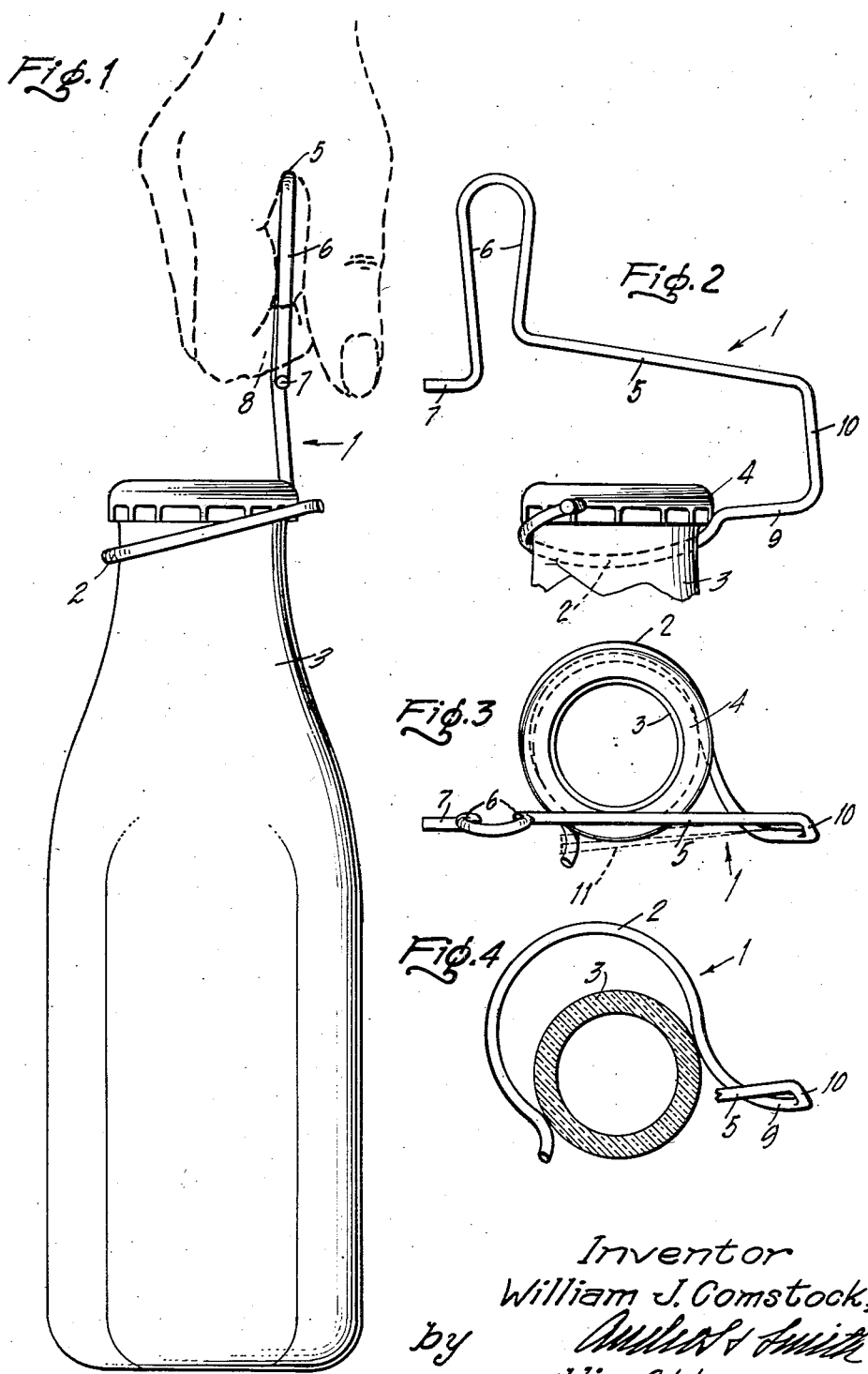
Inventor
William J. Comstock, Jr.
by
His Attorneys

United States Patent Office 2,806,731
Patented Sept. 17, 1957

2,806,731
MILK BOTTLE CARRIER

William J. Comstock, Jr., Bethlehem Center, N. Y.

Application October 8, 1953, Serial No. 384,983

2 Claims. (Cl. 294—27)

My invention relates to carriers for milk bottles.

The principal object thereof is to provide a device which is readily attachable to and detachable from any milk bottle, and which will provide a means for carrying said bottle without any danger of accidentally dropping the same. Another object is to provide a device of this character which is simple and may be cheaply constructed so that it will be acceptable for use by housewives, children and others who may be required to carry a milk bottle from place to place.

I accomplish these objects by the means described below and illustrated in the accompanying drawing in which—

Fig. 1 is an elevation view of my device attached to a milk bottle and showing how the device is gripped by the hand;

Fig. 2 is a side elevation of the device showing a fragmentary portion of a milk bottle to which it is attached;

Fig. 3 is a top plan view of the device as attached to a milk bottle; and

Fig. 4 is a section through the neck of a milk bottle showing my device about to be attached thereto.

Referring to the drawing, my device, represented generally by the numeral 1 is illustrated and will be described as formed from a unitary length of resilient wire which may, for example, be of a diameter of around 5/32 inch. However, it is to be understood that it may be formed of a plastic material, and that it need not be circular in cross section. Adjacent one end thereof the wire is bent to form a hook 2 adapted to be snapped around the neck of a milk bottle 3 adjacent the lip 4 thereof. In other words, the hook is substantially circular and of a diameter approximating the diameter of the neck of said bottle but having an entrance thereto which is somewhat less than the diameter. Adjacent the other end of said wire it is bent to form a handle comprising a portion 5 adapted to be grasped by the hand and an upstanding portion 6 closely adjacent said other end adapted to lie between the thumb and forefinger of the hand when said first portion is grasped thereby. The portion adapted to be grasped by the hand and the portion upstanding therefrom are substantially coplanar and obliquely inclined to the general plane of said hook. Immediately adjacent said other end, the wire is bent at right angles to the upstanding portion 6 as shown at 7 so that the forefinger 8 of the hand may be laid across this bent portion.

The handle forming portion and the hook forming portion are connected together by a portion 9 extending outwardly from the hook and substantially coplanar therewith, and an upstanding portion 10 substantially coplanar with the handle portion so that when the device is attached to the bottle, the handle portion is in spaced relation to the top of the bottle.

From the foregoing it will be apparent that when the device is attached to the milk bottle and the handle is grasped by the hand, the milk bottle will be supported substantially vertical as shown in Fig. 1. Furthermore, when carried in an automobile, a milk bottle with my carrier attached may be held in upright position by means of a supporting cord passed through or tied to the loop in the upstanding portion of the handle.

If desired, a rubber band or string 11 may be stretched or tied across the opening in the hook 2, as shown in dotted outline in Fig. 3, in order positively to prevent the bottle from slipping out of the hook.

While I have described my invention in its preferred embodiment, it is to be understood that the words which I have used are words of description rather than of limitation and that changes, within the purview of the appended claims, may be made without departing from the true scope and spirit of my invention in its broader aspects.

What I claim is:

1. A milk bottle carrier comprising a unitary length of resilient wire bent adjacent one end thereof to form a hook adapted closely to engage the neck of a milk bottle adjacent the lip thereof and having an entrance thereto of a width somewhat less than the diameter of said neck, whereby said entrance must be spread to insert said neck in or remove it from said hook; said wire being bent to form a handle disposed above said hook, including a first portion extending entirely across said hook adapted to be grasped by the hand, a second portion closely adjacent the other end upstanding from said first portion, and a third portion extending downwardly in spaced relation to said second portion; said second and third portions forming an inverted loop adapted to lie between the thumb and forefinger when said first portion is grasped; whereby, swinging of a bottle in said carrier is prevented.

2. A milk bottle carrier comprising a unitary length of resilient wire bent adjacent one end thereof to form an arcuate hook of a diameter adapted closely to engage the neck of a milk bottle adjacent the lip thereof and to engage the underside of said lip when said carrier is lifted; the entrance to said hook being of a width somewhat less than the diameter of said neck; said wire being bent to form a handle for said carrier disposed above and extending entirely across said hook and having its axis lying substantially throughout in a plane obliquely inclined to the plane of said hook; said handle including a first portion adapted to be grasped by the hand and upwardly inclined as it approaches the other end of said wire, and second and third portions closely adjacent said other end of said wire forming an inverted loop upstanding from said first portion and adapted to lie between the thumb and forefinger when said first portion is grasped; whereby, swinging of a bottle in said carrier is prevented.

References Cited in the file of this patent

UNITED STATES PATENTS

| 1,190,607 | Tarbet et al. | July 11, 1916 |
| 1,298,662 | Chadwick | Apr. 1, 1919 |
| 1,320,102 | Smock | Oct. 28, 1919 |
| 1,352,173 | Campbell | Sept. 7, 1920 |
| 2,372,107 | Natho | Mar. 20, 1945 |